United States Patent
Yi et al.

(10) Patent No.: US 10,341,055 B2
(45) Date of Patent: Jul. 2, 2019

(54) METHOD FOR PERFORMING AUTONOMOUS RLC RETRANSMISSION IN A WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/561,767

(22) PCT Filed: Apr. 20, 2016

(86) PCT No.: PCT/KR2016/004118
§ 371 (c)(1),
(2) Date: Sep. 26, 2017

(87) PCT Pub. No.: WO2016/175497
PCT Pub. Date: Nov. 3, 2016

(65) Prior Publication Data
US 2018/0083738 A1    Mar. 22, 2018

Related U.S. Application Data

(60) Provisional application No. 62/153,501, filed on Apr. 27, 2015.

(51) Int. Cl.
*H04L 1/08* (2006.01)
*H04L 1/18* (2006.01)
(Continued)

(52) U.S. Cl.
CPC ............. *H04L 1/08* (2013.01); *H04L 1/1812* (2013.01); *H04L 1/1887* (2013.01);
(Continued)

(58) Field of Classification Search
CPC ....... H04L 1/08; H04L 1/0007; H04L 1/1812; H04L 1/1887; H04L 1/858; H04W 36/02; H04W 24/02; H04W 76/27
See application file for complete search history.

(56) References Cited

U.S. PATENT DOCUMENTS

2002/0021714 A1    2/2002  Seguin
2008/0101312 A1    5/2008  Suzuki et al.
(Continued)

FOREIGN PATENT DOCUMENTS

| EP | 1919114 A1 | 7/2008 |
| JP | 2006505999 A | 2/2006 |
| WO | 2015008962 A1 | 1/2015 |

*Primary Examiner* — Shelly A Chase
(74) *Attorney, Agent, or Firm* — Dentons US LLP

(57) ABSTRACT

The present invention relates to methods and devices for performing autonomous RLC retransmission in a wireless communication system. The methods involve and the devices perform transmitting a RLC PDU to a RLC receiver on a first transmission opportunity. When the RLC PDU is transmitted, a check is performed to determine if a condition for performing a RLC PDU retransmission procedure is met. If the condition is met, the RLC PDU is stored in a re-transmitter buffer and re-transmitted during consecutive transmission opportunities following the first transmission opportunity.

12 Claims, 9 Drawing Sheets

(51) Int. Cl.
*H04W 76/27* (2018.01)
*H04W 24/02* (2009.01)
*H04W 88/02* (2009.01)

(52) U.S. Cl.
CPC ............ *H04W 76/27* (2018.02); *H04W 24/02* (2013.01); *H04W 88/02* (2013.01)

(56) References Cited

U.S. PATENT DOCUMENTS

| | | | | |
|---|---|---|---|---|
| 2009/0296625 | A1* | 12/2009 | Wu | H04L 1/0007 370/315 |
| 2015/0372788 | A1* | 12/2015 | Xiao | H04L 1/08 714/748 |
| 2016/0183158 | A1* | 6/2016 | Decarreau | H04W 36/02 370/328 |

* cited by examiner

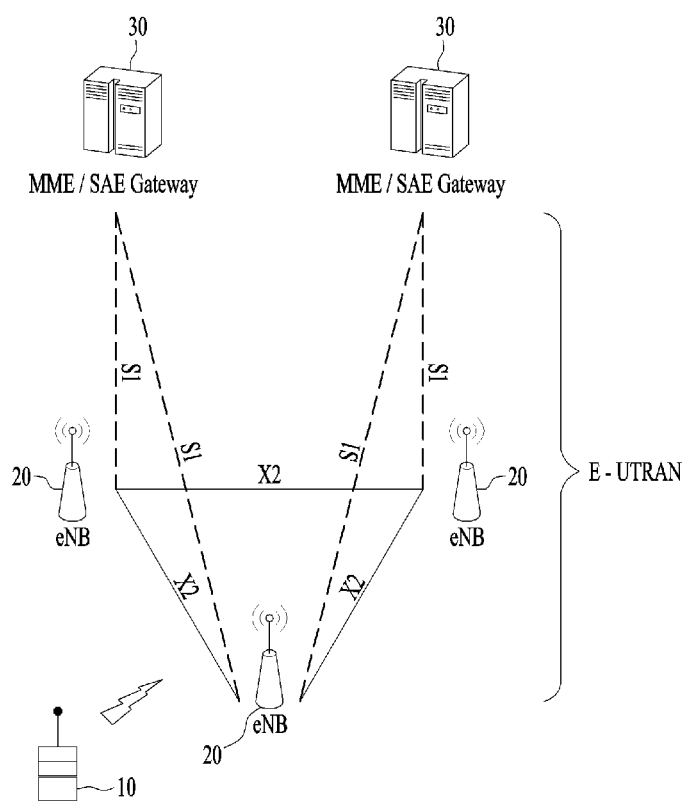

(a) Control-Plane Protocol Stack (b) User-Plane Protocol Stack

METHOD FOR PERFORMING AUTONOMOUS RLC RETRANSMISSION IN A WIRELESS COMMUNICATION SYSTEM AND A DEVICE THEREFOR

This application is a 35 USC § 371 National Stage entry of International Application No. PCT/KR2016/004118 filed on Apr. 20, 2016, and claims priority to U.S. Provisional Application No. 62/153,501 filed on Apr. 27, 2015, all of which are hereby incorporated by reference in their entireties as if fully set forth herein.

TECHNICAL FIELD

The present invention relates to a wireless communication system and, more particularly, to a method for performing autonomous RLC retransmission in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing autonomous RLC retransmission in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

The invention is that when a special condition is met, the AM RLC transmitter retransmits a RLC PDU even if the AM RLC transmitter does not receive Negative RLC feedback (NACK) for the RLC PDU from the AM RLC receiver.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2A is a block diagram illustrating network structure of an evolved universal mobile telecommunication system (E-UMTS)

BEST MODE

Figure 1:
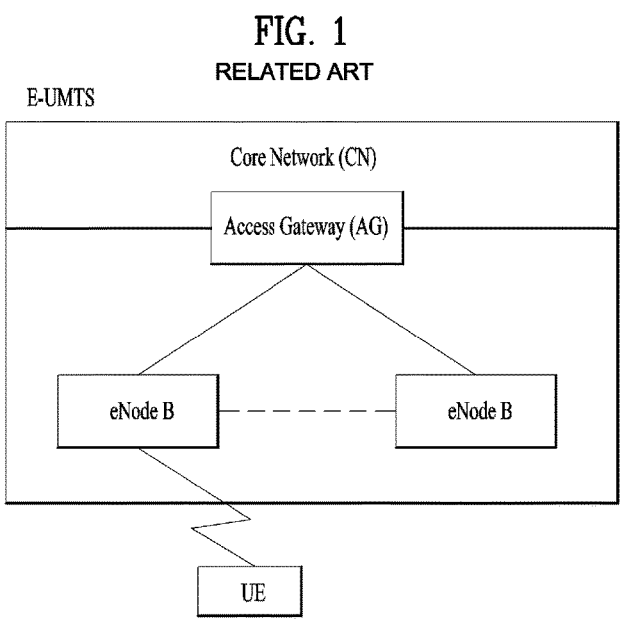
FIG. 1 is a diagram showing a network structure of an Evolved Universal Mobile Telecommunications System (E-UMTS) as an example of a wireless communication system.

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
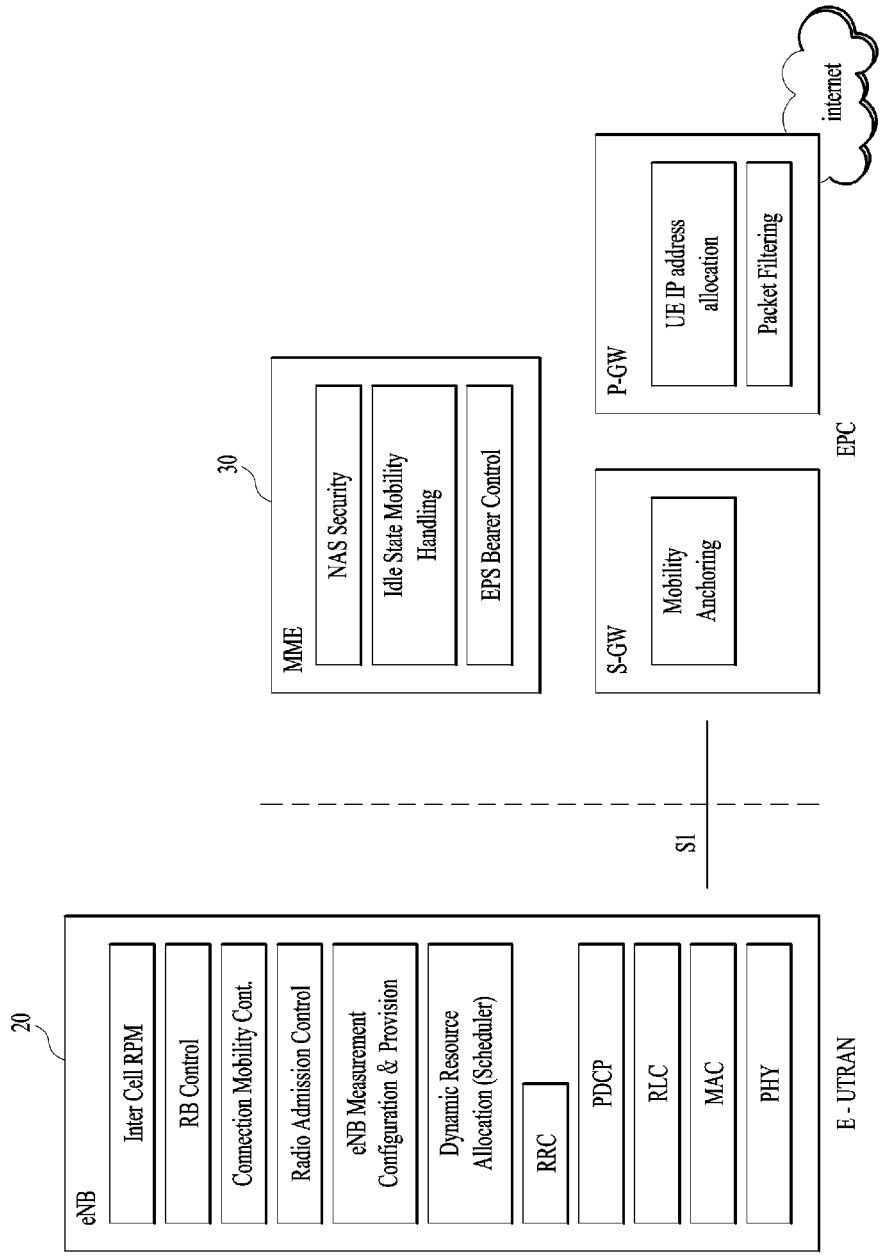
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
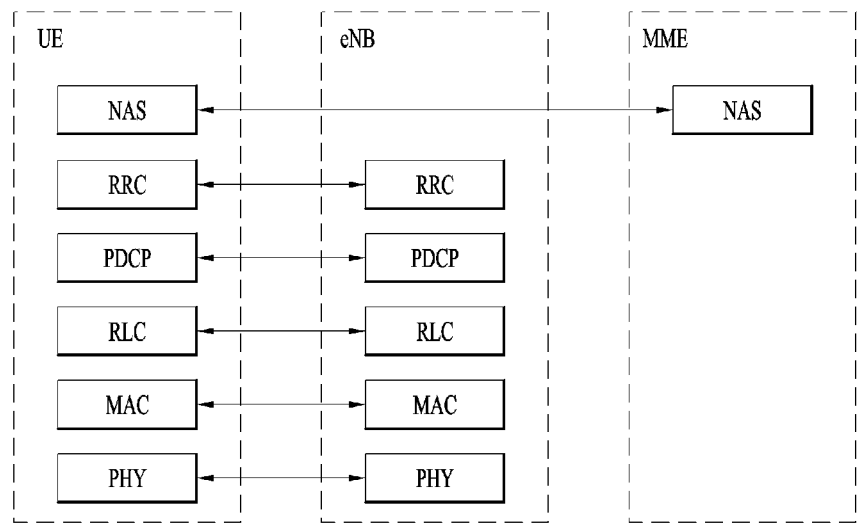
FIG. 3 is a diagram showing a control plane and a user plane of a radio interface protocol between a UE and an E-UTRAN based on a 3rd generation partnership project (3GPP) radio access network standard.
Figure 3:
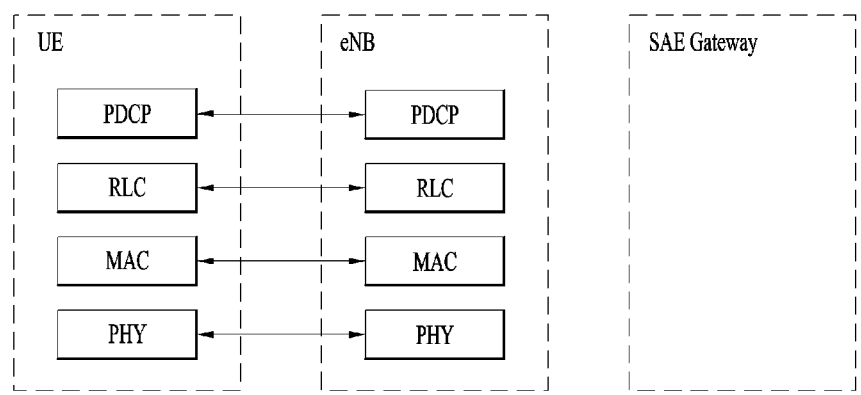

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
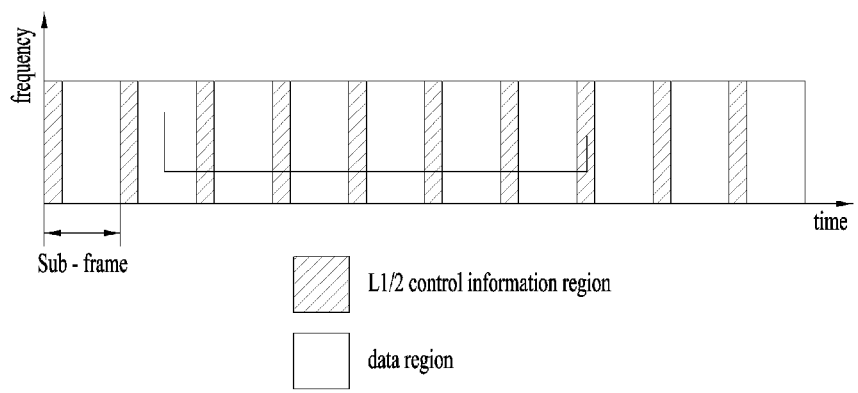
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
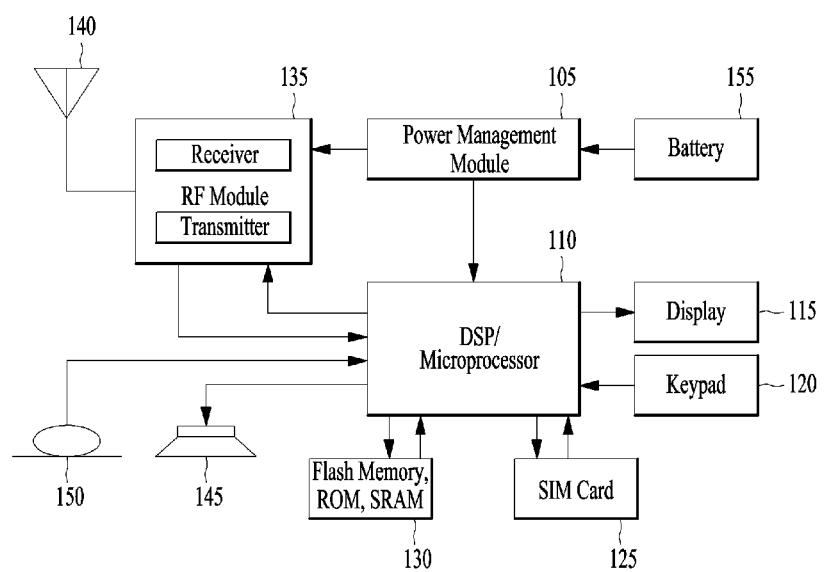
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
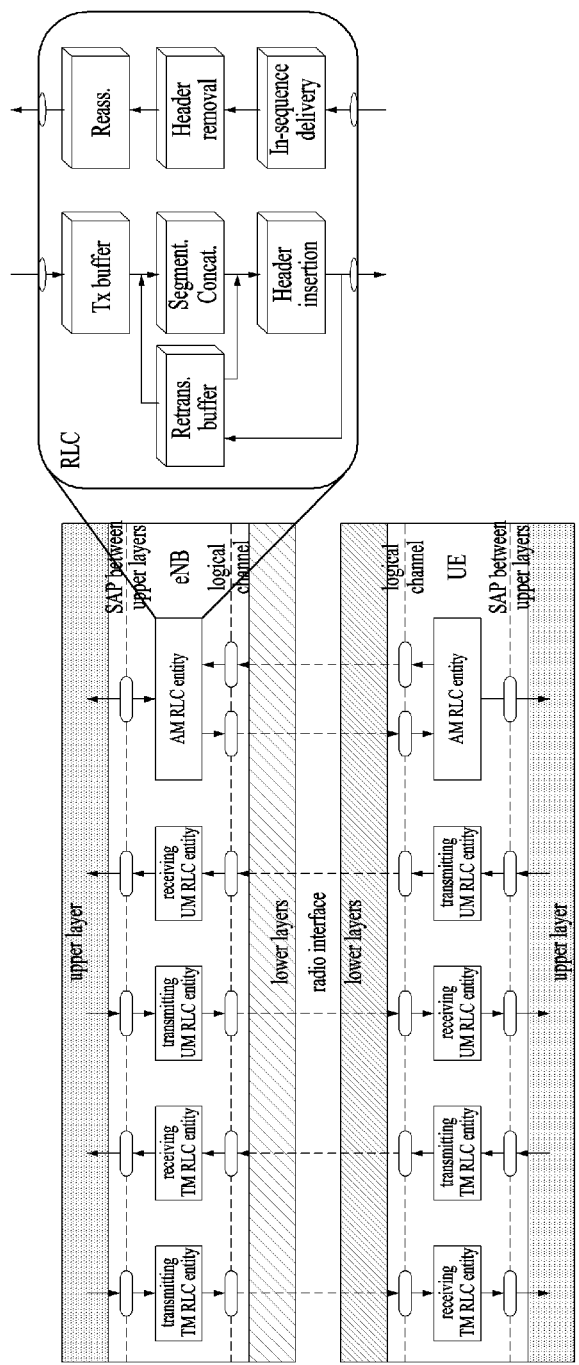
FIG. 6 is a conceptual diagram for an RLC entity architecture.

FIG. 6 is a conceptual diagram for an RLC entity architecture.

The RLC protocol takes data in the form of RLC SDUs from PDCP and delivers them to the corresponding RLC entity in the receiver by using functionality in MAC and physical layers. The relation between RLC and MAC, including multiplexing of multiple logical channels into a single transport channel, is illustrated in FIG. 6. Multiplexing of several logical channels into a single transport channel is mainly used for priority handling in conjunction with downlink and uplink scheduling.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Meanwhile, retransmission of missing PDUs is one of the main functionalities of the RLC. Although most of the errors can be handled by the hybrid-ARQ protocol, there are benefits of having a second-level retransmission mechanism as a complement. By inspecting the sequence numbers of the received PDUs, missing PDUs can be detected and a retransmission requested from the transmitting side.

Different services have different requirements; for some services (for example, transfer of a large file), error-free delivery of data is important, whereas for other applications (for example, streaming services), a small amount of missing packets is not a problem. The RLC can therefore operate in three different modes, depending on the requirements from the application.

Figure 7:
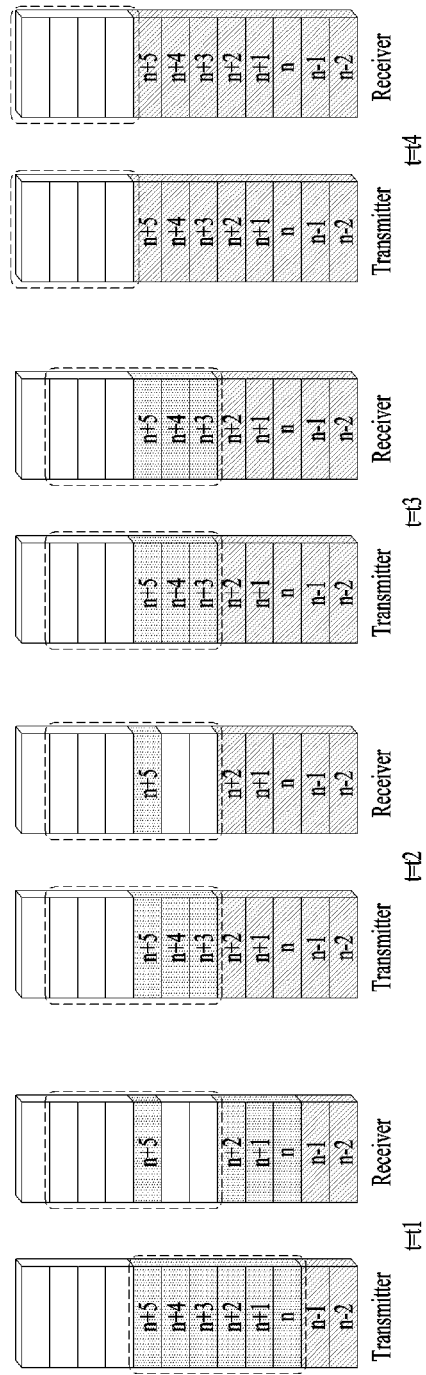
FIG. 7 is a conceptual diagram for performing re-transmission in an RLC entity.

FIG. 7 is a conceptual diagram for performing re-transmission in an RLC entity.

The RLC entity is responsible for regimentation of IP packets, also known as RLC SDUs, form the PDCP into smaller units, RLC PDUs. It also handles retransmission of erroneously received PDUs, as well as duplicate removal and concatenation of received PDUs. Finally, RLC ensures in-sequence delivery of RLC SDUs to upper layers.

The RLC retransmission mechanism is responsible for providing error-free delivery of data to higher layers. To accomplish this, a retransmission protocol operates between the AM RLC entities in the receiver and transmitter. By monitoring the incoming sequence numbers, the receiving RLC can identify missing PDUs.

When the AM RLC is configured to request retransmissions of missing PDUs as described above, it is said to be operating in Acknowledged Mode (AM). The AM RLC is typically used for TCP-based services such as file transfer where error-free data delivery is of primary interest.

The transmitting side of an AM RLC entity can receive a negative acknowledgement (notification of reception failure by its peer AM RLC entity) for an AMD PDU or a portion of an AMD PDU by a RLC status PDU from it peer AM RLC entity.

When receiving a negative acknowledgement for an AMD PDU or a portion of an AMD PDU by the RLC status PDU from its peer AM RLC entity, the transmitting side of the AM RLC entity may consider the AMD PDU or the portion of the AMD PDU for which a negative acknowledgement was received for retransmission if a Sequence Number (SN) of the corresponding AMD PDU falls within the range $VT(A) \leq SN < VT(S)$.

Herein, the 'VT(A)' indicates an acknowledgement state variable, this state variable holds the value of the SN of the next AMD PDU for which a positive acknowledgment is to be received in-sequence, and it serves as the lower edge of the transmitting window. It is initially set to 0, and is updated whenever the AM RLC entity receives a positive acknowledgment for an AMD PDU with SN=VT(A). And the 'VT(S)' indicates a send state variable, this state variable holds the value of the SN to be assigned for the next newly generated AMD PDU. It is initially set to 0, and is updated whenever the AM RLC entity delivers an AMD PDU with SN=VT(S).

When an AMD PDU or a portion of an AMD PDU is considered for retransmission, the transmitting side of the AM RLC entity may set the RETX_COUNT associated with the AMD PDU to zero if the AMD PDU is considered for retransmission for the first time. And the transmitting side of the AM RLC entity may increment the RETX_COUNT if it (the AMD PDU or the portion of the AMD PDU that is considered for retransmission) is not pending for retransmission already, or a portion of it is not pending for retransmission already. And the transmitting side of the AM RLC entity may indicate to upper layers that max retransmission has been reached if RETX_COUNT=maxRetxThreshold.

Herein, the 'RETX_COUNT' is a counter counting the number of retransmissions of an AMD PDU. There is one RETX_COUNT counter per PDU that needs to be retransmitted. And the 'maxRetxThreshold' is configured maximum number of re-transmission.

When retransmitting an AMD PDU, the transmitting side of an AM RLC entity may segment the AMD PDU, form a new AMD PDU segment which will fit within the total size of RLC PDU(s) indicated by lower layer at the particular transmission opportunity and deliver the new AMD PDU segment to lower layer if the AMD PDU doesn't entirely fit within the total size of RLC PDU(s) indicated by lower layer at the particular transmission opportunity.

When retransmitting a portion of an AMD PDU, the transmitting side of an AM RLC entity may segment the portion of the AMD PDU as necessary, form a new AMD PDU segment which will fit within the total size of RLC PDU(s) indicated by lower layer at the particular transmission opportunity and deliver the new AMD PDU segment to lower layer.

Regarding FIG. 7, RLC status PDUs are reported as feeding back to the transmitting RLC, requesting retransmission of missing PDUs. When to feedback a status report is configurable, but a report typically contains information about multiple PDUs and is transmitted relatively infrequently. Based on the received status report, the RLC entity at the transmitter can take the appropriate action and retransmit the missing PDUs if requested. Regarding FIG. 7, at time t=t1, PDUs up to n+5 have been transmitted. Only PDU n+5 has arrived and PDUs n+3 and n+4 are missing. This can cause a reordering timer to start. However, in this example no PDUs arrive prior to the expiration of the timer. The expiration of the timer, at time t=t2, triggers the receiver to send a control PDU containing a status report, indicating the missing PDUs, to its peer entity. Control PDUs have higher priority than data PDUs to avoid the status reports being unnecessarily delayed and negatively impact the retransmission delay. Upon reception of the status report at time t=t3, the transmitter knows that PDUs up to n+2 have been received correctly and the transmission window is advanced. The missing PDUs n+3 and n+4 are retransmitted and, this time, correctly received. The retransmission was triggered by the reception of a status report in this example. However, as the hybrid-ARQ and RLC protocols are located in the same node, tight interaction between the two is possible. The hybrid-ARQ protocol at the transmitting end could therefore inform the RLC at the transmitting end in case the transport block(s) containing PDUs n+3 and n+4 have failed. The RLC can use this to trigger retransmission of missing PDUs without waiting for an explicit RLC status report, thereby reducing the delays associated with RLC retransmissions.

Finally, at time t=t4, all PDUs, including the retransmissions, have been delivered by the transmitter and successfully received. As n+5 was the last PDU in the transmission buffer, the transmitter requests a status report from the receiver by setting a flag in the header of the last RLC data PDU. Upon reception of the PDU with the flag set, the receiver will respond by transmitting the requested status report, acknowledging all PDUs up to and including n+5. Reception of the status report by the transmitter causes all the PDUs to be declared as correctly received and the transmission window is advanced.

Status reports can, as mentioned earlier, be triggered for multiple reasons. However, to control the amount of status reports and to avoid flooding the return link with an excessive number of status reports, it is possible to use a status prohibit timer. With such a timer, status reports cannot be transmitted more often than once per time interval as determined by the timer.

For the initial transmission, it is relatively straightforward to rely on a dynamic PDU size as a means to handle the varying data rates. However, the channel conditions and the amount of resources may also change between RLC retransmissions. To handle these variations, already transmitted PDUs can be (re)segmented for retransmissions. The reordering and retransmission mechanisms described above still apply; a PDU is assumed to be received when all the segments have been received. Status reports and retransmissions operate on individual segments; only the missing segment of a PDU needs to be retransmitted.

In the prior art, the AM RLC transmitter retransmits a RLC PDU only when the NACK for the RLC PDU is received from the AM RLC receiver via RLC Status Report. It takes quite amount of time due to round trip time of data transmission and feedback. In some cases, it is necessary to perform fast retransmission to reduce the overall transmission delay.

Figure 8:
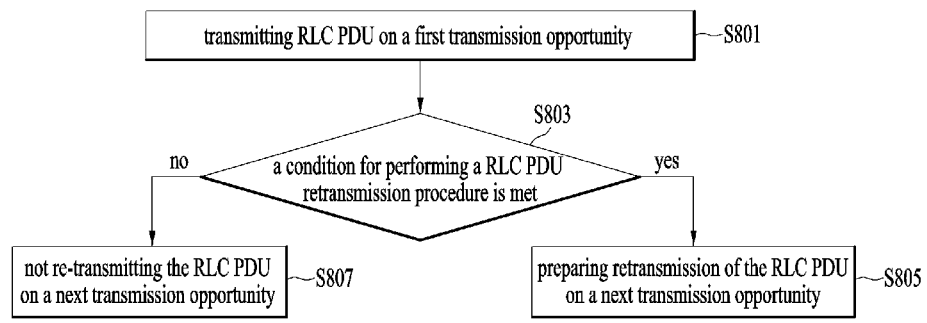
FIG. 8 is a conceptual diagram for performing autonomous RLC retransmission in a wireless communication system according to embodiments of the present invention.

FIG. 8 is a conceptual diagram for performing autonomous RLC retransmission in a wireless communication system according to embodiments of the present invention.

The invention is that when a special condition is met, the AM RLC transmitter retransmits a RLC PDU even if the AM RLC transmitter does not receive Negative RLC feedback (NACK) for the RLC PDU from the AM RLC receiver.

The UE transmits a RLC Protocol Data Unit (PDU) to a RLC receiver on a first transmission opportunity (S801). And the UE checks whether a condition for performing a RLC PDU retransmission procedure is met or not, when the RLC PDU is transmitted to the RLC receiver on the first transmission opportunity (S803).

The condition for performing a RLC PDU retransmission procedure includes the following cases: i) the channel quality (RSRP or RSRQ) becomes lower than a threshold, ii) the number of HARQ failure reaches a configured number, iii) the RLC PDU to be transmitted contains higher priority information, e.g. RLC Control PDU or retransmitted RLC PDU, or iv) RRC signal for performing an autonomous RLC PDU retransmission procedure is received.

When the condition is met, the UE prepares the RLC PDU retransmission during consecutive transmission opportunities following the first transmission opportunity (S805).

Preferably, the number of consecutive transmission opportunities is configured by RRC.

That the UE prepares retransmission of the RLC PDU during consecutive transmission opportunities includes that the RLC transmitter stores the RLC PDU in a RLC re-transmitter buffer when the RLC PDU is transmitted, or copies the RLC PDU to a RLC re-transmitter buffer to retransmit the RLC PDU on a next transmission opportunity.

That the UE prepares retransmission of the RLC PDU during consecutive transmission opportunities corresponds that the UE changes the AM RLC transmitter from normal operation mode to autonomous repetition mode.

In the autonomous repetition mode, when the AM RLC transmitter receives an UL resource from the MAC entity, the AM RLC transmitter generates a RLC PDU to be fit to the received UL resource, and submit it to the MAC entity. At the same time, the AM RLC transmitter copies the RLC PDU to the retransmission buffer to retransmit it in the next transmission opportunity. After that, when the AM RLC transmitter receives another UL resource from the MAC entity, the AM RLC transmitter retransmits the RLC PDU stored in the retransmission buffer, and copies it again to the retransmission buffer. The number of copying the RLC PDU, i.e. the number of transmission of the same RLC PDU is configured by RRC.

In this mode, the RLC entity can retransmit the RLC PDU without considering that RLC status indicating NACK is received.

When the RLC entity performs retransmission of a RLC PDU, the RLC entity re-segments the RLC PDU if the UL resource cannot accommodate retransmitted RLC PDU. In this case, the number of transmission is counted only when all segments of the PDU is transmitted.

When the condition isn't met, the RLC PDU is not re-transmitted during consecutive transmission opportunities following the first transmission opportunity (S807).

Meanwhile, when another special condition occurs, the UE changes the AM RLC transmitter from autonomous repetition mode to normal operation mode.

The another special condition includes: i) the channel quality (RSRP or RSRQ) becomes higher than a threshold, or ii) the number of HARQ success reaches a configured number, or iii) the RLC PDU to be transmitted contains lower priority information, e.g. RLC Data PDU, or iv) RRC signal for stopping an autonomous RLC PDU retransmission procedure is received.

The autonomous RLC retransmission mode can be triggered per UE or per RLC entity.

Figure 9:
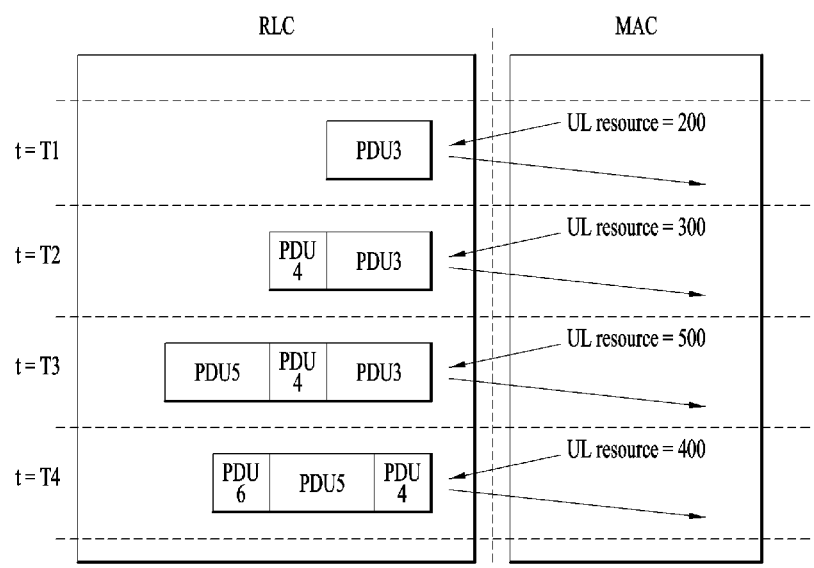
FIGS. 9 and 10 are examples for performing autonomous RLC retransmission in a wireless communication system according to embodiments of the present invention.

FIG. 9 is an example for performing autonomous RLC retransmission in a wireless communication system according to embodiments of the present invention.

The FIG. 9 shows an example of the autonomous RLC retransmission methods. In this example, the eNB configures the UE with autonomous RLC retransmission with RSRQ threshold and the number of transmission=3.

The RSRQ becomes lower than the threshold, and the autonomous RLC retransmission mode is enabled.

At t=T1, UL grant is received, and the MAC entity indicates UL resource=200 to the RLC entity. The RLC entity generates the PDU3 with size=200, and submits it to the MAC entity. At the same time, the RLC entity copies the PDU3 to the retransmission buffer to prepare for retransmission.

At t=T2, UL grant is received, and the MAC entity indicates UL resource=300 to the RLC entity. The RLC entity first allocates the UL resource to the PDU3, and generates the PDU4 with size=100 for the remaining UL resource. The RLC entity submits both PDU3 and PDU4 to the MAC entity, and, at the same time, the RLC entity copies the PDU4 to the retransmission buffer to prepare for retransmission.

At t=T3, UL grant is received, and the MAC entity indicates UL resource=500 to the RLC entity. The RLC entity first allocates the UL resource to the PDU3 and PDU4, and generates the PDU5 with size=200 for the remaining UL resource. The RLC entity submits PDU3, PDU4, and PDU5 to the MAC entity, and, at the same time, the RLC entity copies the PDU5 to the retransmission buffer to prepare for retransmission.

At t=T4, UL grant is received, and the MAC entity indicates UL resource=400 to the RLC entity. The RLC entity first allocates the UL resource to the PDU4 and PDU5, and generates the PDU6 with size=100 for the remaining UL resource. The RLC entity does not allocate the UL resource to the PDU3, as the number of transmission has been reached for the PDU3. The RLC entity submits PDU4, PDU5, and PDU6 to the MAC entity, and, at the same time, the RLC entity copies the PDU6 to the retransmission buffer to prepare for retransmission.

Figure 10:
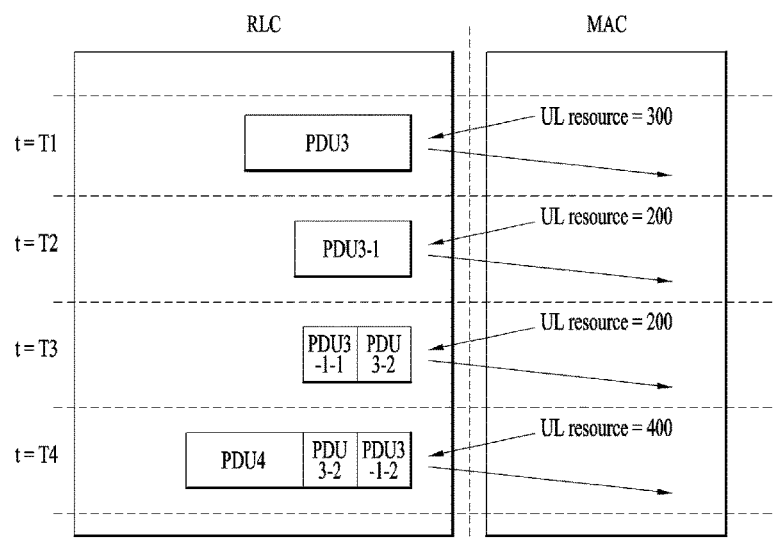

FIG. 10 is an example for performing autonomous RLC retransmission in a wireless communication system according to embodiments of the present invention.

The FIG. 10 shows an example of Autonomous RLC Retransmission with re-segmentation. In this example, the eNB configures the UE with autonomous RLC retransmission with RSRQ threshold and the number of transmission=3.

The RSRQ becomes lower than the threshold, and the autonomous RLC retransmission mode is enabled.

At t=T1, UL grant is received, and the MAC entity indicates UL resource=300 to the RLC entity. The RLC entity generates the PDU3 with size=300, and submits it to the MAC entity. At the same time, the RLC entity copies the PDU3 to the retransmission buffer to prepare for retransmission.

At t=T2, UL grant is received, and the MAC entity indicates UL resource=200 to the RLC entity. The RLC entity re-segments the PDU3 to PDU3-1=200 and PDU3-2=100, and submits the PDU3-1 to the MAC entity.

At t=T3, UL grant is received, and the MAC entity indicates UL resource=200 to the RLC entity. The RLC entity first allocates the UL resource to the PDU3-2, and re-segments the PDU3-1 to PDU3-1-1=100 and PDU3-1-2=100, and allocates the remaining UL resource to the PDU3-1-1. The RLC entity submits the PDU3-2 and PDU3-1-1 to the MAC entity.

At t=T4, UL grant is received, and the MAC entity indicates UL resource=400 to the RLC entity. The RLC entity first allocates the UL resource to the PDU3-1-2 and PDU3-2, and generates the PDU4 with size=200 for the remaining UL resource, and submits them to the MAC entity. As the PDU3 has been transmitted configured number of times, the RLC entity does not retransmit the PDU3 any more unless the NACK is received from the RLC receiver.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
   transmitting, by a Radio Link Control (RLC) transmitter, a RLC Protocol Data Unit (PDU) to a RLC receiver on a first transmission opportunity;
   checking whether a condition for performing a RLC PDU retransmission procedure is met, when the RLC PDU is transmitted to the RLC receiver on the first transmission opportunity; and
   re-transmitting, by the RLC transmitter, the RLC PDU during consecutive transmission opportunities following the first transmission opportunity when the condition is met,
   wherein the RLC transmitter stores the RLC PDU in a RLC re-transmitter buffer when the RLC PDU is transmitted on the first transmission opportunity when the condition is met.

2. The method according to claim 1, wherein the condition is met when a channel quality becomes lower than a threshold, a number of HARQ failures reach a configured number, a RLC PDU to be transmitted contains higher priority information or Radio Resource Control (RRC) signaling for performing the RLC PDU retransmission is received.

3. The method according to claim 1, wherein the number of consecutive transmission opportunities is configured by an RRC layer.

4. The method according to claim 1 further comprising:
   re-segmenting the RLC PDU when the UE performs the RLC PDU retransmission procedure, and when UL resources cannot accommodate the retransmitted RLC PDU.

5. A method for a User Equipment (UE) operating in a wireless communication system, the method comprising:
   transmitting, by a Radio Link Control (RLC) transmitter, a RLC Protocol Data Unit (PDU) to a RLC receiver on a first transmission opportunity;
   checking whether a condition for performing a RLC PDU retransmission procedure is met, when the RLC PDU is transmitted to the RLC receiver on the first transmission opportunity; and
   preparing, by the RLC transmitter, a retransmission of the RLC PDU on a next transmission opportunity following the first transmission opportunity when the condition is met,
   wherein preparing the retransmission of the RLC PDU includes the RLC transmitter storing the RLC PDU in a RLC re-transmitter buffer when the RLC PDU is transmitted.

6. The method according to claim 5, wherein preparing the retransmission of the RLC PDU includes the RLC transmitter copying the RLC PDU to the RLC re-transmitter buffer to retransmit the RLC PDU on the next transmission opportunity.

7. A User Equipment (UE) operating in a wireless communication system, the UE comprising:
   a Radio Link Control (RLC) transmitter; and
   a processor, operatively connected to the RLC transmitter, configured to:
   control the RLC transmitter to transmit a RLC Protocol Data Unit (PDU) to a RLC receiver on a first transmission opportunity;
   check whether a condition for performing a RLC PDU retransmission procedure is met, when the RLC PDU is transmitted to the RLC receiver on the first transmission opportunity; and
   control the RLC transmitter to retransmit the RLC PDU during consecutive transmission opportunities following the first transmission opportunity when the condition is met,
   wherein the RLC transmitter stores the RLC PDU in a RLC re-transmitter buffer when the RLC PDU is transmitted on the first transmission opportunity when the condition is met.

8. The UE according to claim 7, wherein the condition is met when a channel quality becomes lower than a threshold, a number of HARQ failures reach a configured number, a RLC PDU to be transmitted contains higher priority information or Radio Resource Control (RRC) signaling for performing the RLC PDU retransmission is received.

9. The UE according to claim 7, wherein the number of consecutive transmission opportunities is configured by an RRC layer.

10. The UE according to claim 7, wherein the processor is further configured to re-segment the RLC PDU when the UE performs the RLC PDU retransmission procedure, and when UL resources cannot accommodate the retransmitted RLC PDU.

11. A User Equipment (UE) operating in a wireless communication system, the UE comprising:
   a Radio Link Control (RLC) transmitter; and
   a processor, operatively connected to the RLC transmitter, configured to:
   control the RLC transmitter to transmit a RLC Protocol Data Unit (PDU) to a RLC receiver on a first transmission opportunity,
   check whether a condition for performing a RLC PDU retransmission procedure is met, when the RLC PDU is transmitted to the RLC receiver on a first transmission opportunity, and
   control the RLC transmitter to prepare a retransmission of the RLC PDU on a next transmission opportunity when the condition is met,
   wherein preparing the retransmission of the RLC PDU includes the RLC transmitter storing the RLC PDU in a RLC re-transmitter buffer when the RLC PDU is transmitted.

12. The UE according to claim 11, wherein preparing the retransmission of the RLC PDU includes the RLC transmitter copying the RLC PDU to the RLC re-transmitter buffer to retransmit the RLC PDU on a next transmission opportunity.

* * * * *